(12) United States Patent
Chen

(10) Patent No.: US 9,772,955 B2
(45) Date of Patent: *Sep. 26, 2017

(54) ELECTRONIC SYSTEM AND NON-TRANSITORY COMPUTER READABLE RECORDING MEDIUM CAN PERFORM REPORT RATE SETTING METHOD

(71) Applicant: PixArt Imaging Inc., Hsin-Chu (TW)

(72) Inventor: Chun-Wei Chen, Sunnyvale, CA (US)

(73) Assignee: PixArt Imaging Inc., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/448,554

(22) Filed: Mar. 2, 2017

(65) Prior Publication Data

US 2017/0177510 A1    Jun. 22, 2017

Related U.S. Application Data

(63) Continuation-in-part of application No. 14/141,442, filed on Dec. 27, 2013, now Pat. No. 9,626,269.

(30) Foreign Application Priority Data

Jun. 17, 2013 (TW) .............................. 102121354 A

(51) Int. Cl.
*G06F 3/00* (2006.01)
*G06F 13/10* (2006.01)
*G06F 13/20* (2006.01)

(52) U.S. Cl.
CPC ............ *G06F 13/102* (2013.01); *G06F 13/20* (2013.01)

(58) Field of Classification Search
None
See application file for complete search history.

(56) References Cited

U.S. PATENT DOCUMENTS

| 7,356,621 B1* | 4/2008 | Craighead | G06F 13/102 |
| | | | 710/22 |
| 2005/0138231 A1* | 6/2005 | Yamaguchi | G06F 13/102 |
| | | | 710/15 |
| 2006/0153307 A1 | 7/2006 | Brown | |
| 2006/0212247 A1 | 9/2006 | Shimoyama | |
| 2008/0220828 A1 | 9/2008 | Jensen | |
| 2008/0304174 A1 | 12/2008 | Itagaki | |
| 2009/0059872 A1* | 3/2009 | Malik | H04W 4/02 |
| | | | 370/338 |
| 2011/0296065 A1 | 12/2011 | Daecke | |
| 2011/0302299 A1 | 12/2011 | Fischer | |

(Continued)

FOREIGN PATENT DOCUMENTS

TW    201040795    11/2010

*Primary Examiner* — Elias Mamo
(74) *Attorney, Agent, or Firm* — Winston Hsu

(57) ABSTRACT

An electronic system that can automatically set a report rate, which comprises: a first electronic apparatus; a second electronic apparatus; a transmitting interface, wherein the second electronic apparatus transmits data to the first electronic apparatus via the transmitting interface; and a processing unit, for automatically setting a report rate of the second electronic apparatus or the transmitting interface according to a type of a software program that the first electronic apparatus executes. The type of the software program can be replaced by other factors.

9 Claims, 16 Drawing Sheets

(56) References Cited

U.S. PATENT DOCUMENTS

2011/0321112 A1* 12/2011 Nagy .................. H04W 28/22
                                                              725/118
2012/0290784 A1    11/2012 Katagiri
2015/0026398 A1*   1/2015 Kim ..................... G06F 13/102
                                                              711/105
2016/0360206 A1* 12/2016 Wu ..................... H04N 19/146

* cited by examiner

ELECTRONIC SYSTEM AND NON-TRANSITORY COMPUTER READABLE RECORDING MEDIUM CAN PERFORM REPORT RATE SETTING METHOD

CROSS REFERENCE TO RELATED APPLICATIONS

This application is a continuation-in-part application of applicant's earlier application, Ser. No. 14/141,442, filed 2013 Dec. 27, and is included herein by reference.

BACKGROUND OF THE INVENTION

1. Field of the Invention

The present invention relates to an electronic system and a computer readable recording media that can perform a report rate setting method, and particularly relates to an electronic system that can automatically perform a report rate setting method and a computer readable recording media that can perform a report rate setting method with an automatic report rate setting mechanism.

2. Description of the Prior Art

In the prior art, if a computer desires to correctly transmit data to and receives data from a peripheral electronic apparatus, the report rate for the peripheral electronic apparatus needs to be set. The report rate indicates the frequency that the peripheral electronic apparatus transmits data. For example, 1000 times/sec or 500 times/sec. The max report rate that can be provided can be determined based on the transmitting ability for the peripheral electronic apparatus or the transmitting ability of the transmitting interface. Not only the max report rate that can be provided but also the sensitivity must be concerned while setting the report rate. Different sensitivities are needed if the computer executes different kinds of soft wares. Higher report rate means the peripheral electronic apparatus has a higher sensitivity, but has larger power consumption. On the contrary, lower report rate means the peripheral electronic apparatus has lower power consumption, but has a lower sensitivity. Therefore a suitable report rate is hard to select. Additionally, a traditional interface is hard for a user to set the report rate.

SUMMARY OF THE INVENTION

Therefore, one objective of the present invention is to provide an electronic system that can automatically perform a report rate setting method and a computer readable recording media that can perform a report rate setting method with an automatic report rate setting mechanism.

Another objective of the present invention is to provide an electronic system that can be manually set a report rate and a computer readable recording media that can perform a report rate setting method with a report rate manually setting mechanism.

One embodiment of the present invention provides a non-transitory computer readable recording medium storing at least one program, a report rate setting method applied to an electronic system comprising a portable apparatus, a server and a transmitting interface can be performed if the program is executed. The portable apparatus transmits data to the server via the transmitting interface. The report rate setting method comprises: (a) determining a type of a software program that the portable apparatus executes; and (b) automatically setting a report rate of the portable apparatus or the transmitting interface according to the type of the software program, wherein the report rate indicates a frequency at which the portable apparatus transmits data to the server, and the report rate indicates a time gap between successive transmissions of data from the portable apparatus to the server.

Another embodiment of the present invention provides a non-transitory computer readable recording medium storing at least one program, a report rate setting method applied to an electronic system comprising a stand-alone apparatus, a server and a transmitting interface can be performed if the program is executed. The stand-alone apparatus transmits data to the server via the transmitting interface. The report rate setting method comprises: (a) determining an operation state of the stand-alone apparatus; and (b) automatically setting a report rate of the stand-alone apparatus or the transmitting interface according to the operation state, wherein the report rate indicates a frequency at which the stand-alone apparatus transmits data to the server, and the report rate indicates a time gap between successive transmissions of data from the stand-alone apparatus to the server.

Another embodiment of the present invention provides a non-transitory computer readable recording medium storing at least one program, a report rate setting method applied to a VR system comprising a game console, a control apparatus and a transmitting interface can be performed if the program is executed. The control apparatus transmits dada to the game console via the transmitting interface. The report rate setting method comprises: (a) determining a type of a game program that the game console executes; and (b) automatically setting a report rate of the control apparatus or the transmitting interface according to the type of the game program, wherein the report rate indicates a frequency at which the control apparatus transmits data to the game console, and the report rate indicates a time gap between successive transmissions of data from the control apparatus to the game console.

Still another embodiment of the present invention provides a non-transitory computer readable recording medium storing at least one program, a report rate setting method applied to an electronic system comprising a first electronic apparatus, a second electronic apparatus and a transmitting interface can be performed if the program is executed. The second electronic apparatus transmits data to the first electronic apparatus via the transmitting interface. The report rate setting method comprises: (a) determining an environment condition for the second electronic apparatus; and (c) automatically setting a report rate of the second electronic apparatus or the transmitting interface according to the environment condition, wherein the report rate indicates a frequency at which the second electronic apparatus transmits data to the first electronic apparatus, and the report rate indicates a time gap between successive transmissions of data from the second electronic apparatus to the first electronic apparatus.

Different report rate setting methods can be acquired according to above-mentioned embodiments, which can be performed via a computer readable recording media. The steps can be easily obtained based on above-mentioned embodiments, thus are omitted for brevity here.

In view of above-mentioned embodiments, the present invention provides a mechanism for automatically setting the report rate, such that the apparatus need to frequently transmit data can have an optimized balance for the sensitivity and the power consumption. Additionally, the present invention also provides a mechanism for manually setting the report rate, such that a user can rapidly and conveniently set the report rate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
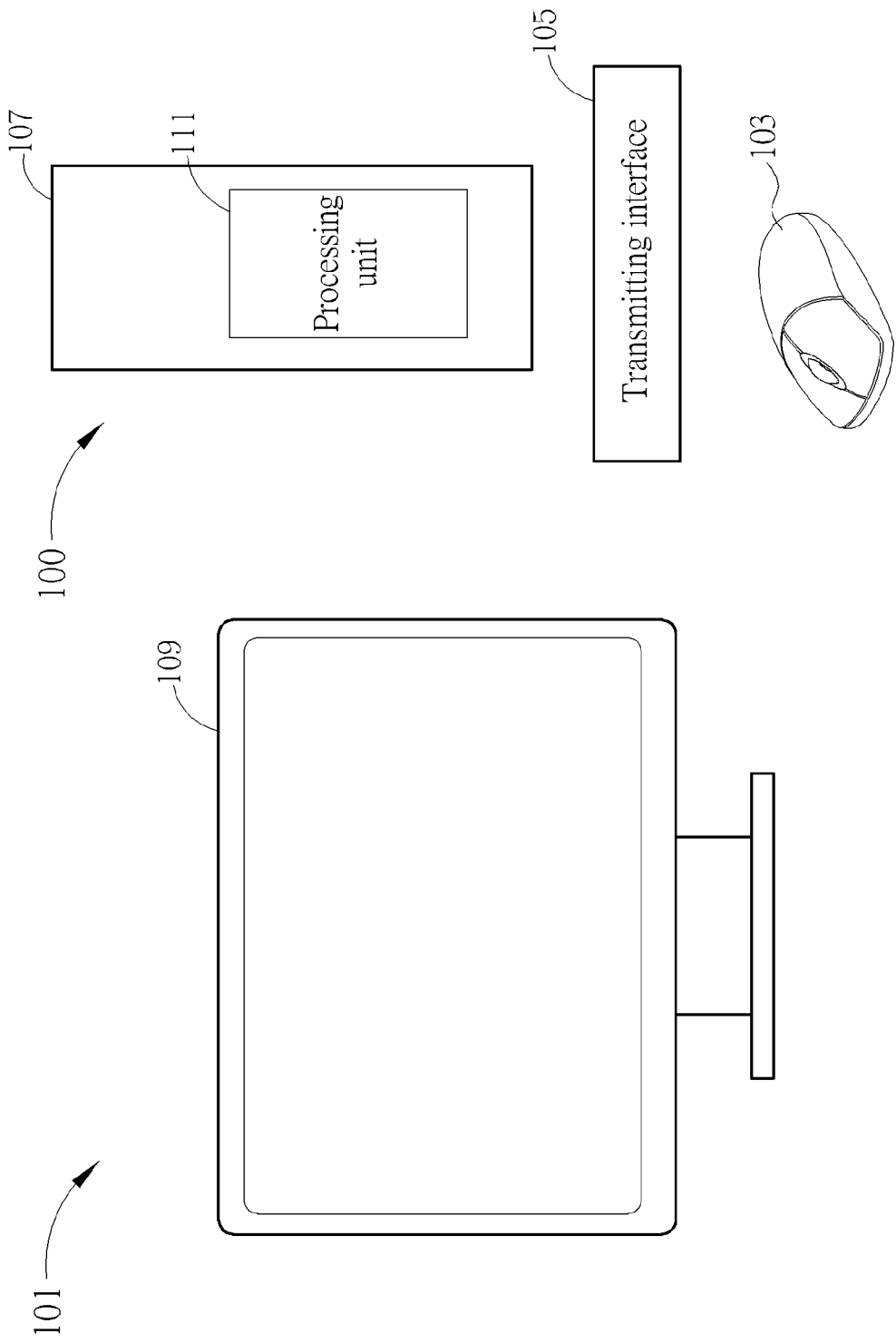
FIG. 1 is a schematic diagram illustrating an electronic system according to an embodiment of the present invention.

FIG. 1 is a schematic diagram illustrating an electronic system 100 according to an embodiment of the present invention. As shown in FIG. 1, the electronic system 100 comprises a first electronic apparatus 101, a second electronic apparatus 103 and a transmitting interface 105 (ex. bluetooth, USB, or other wire/wireless interfaces). The second electronic apparatus 103 transmits data to the first electronic apparatus 101 via the transmitting interface 105. In this embodiment, the first electronic apparatus 101 is a computer, and the second electronic apparatus 103 is an optical mouse. However, it does not mean to limit the scope of the present invention. The first electronic apparatus 101 and the second electronic apparatus 103 can be other electronic apparatuses. As above-mentioned description, the first electronic apparatus 101 is a computer 101 comprising a host 107 and a display 109. The host 107 comprises a processing unit 111 such as the processor. Please note the processing unit 111 can be provided in other locations other than in the host 107. The processing unit 111 automatically sets a report rate of the second electronic apparatus 103 or the transmitting interface 105 according to a type of a software program that the first electronic apparatus 101 executes.

The report rate indicates a frequency at which the second electronic apparatus 103 transmits data to the first electronic apparatus 101, and the report rate indicates a time gap between successive transmissions of data from the second electronic apparatus 103 to the first electronic apparatus 101.

Figure 2:
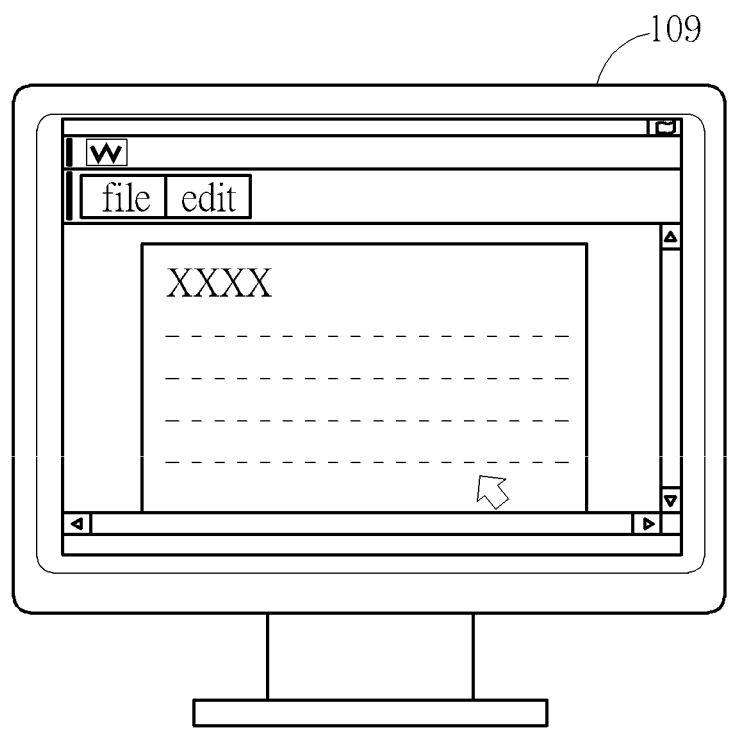
FIG. 2 is a schematic diagram illustrating the situation that an electronic system according to an embodiment executes a document processing software program.
Figure 3:
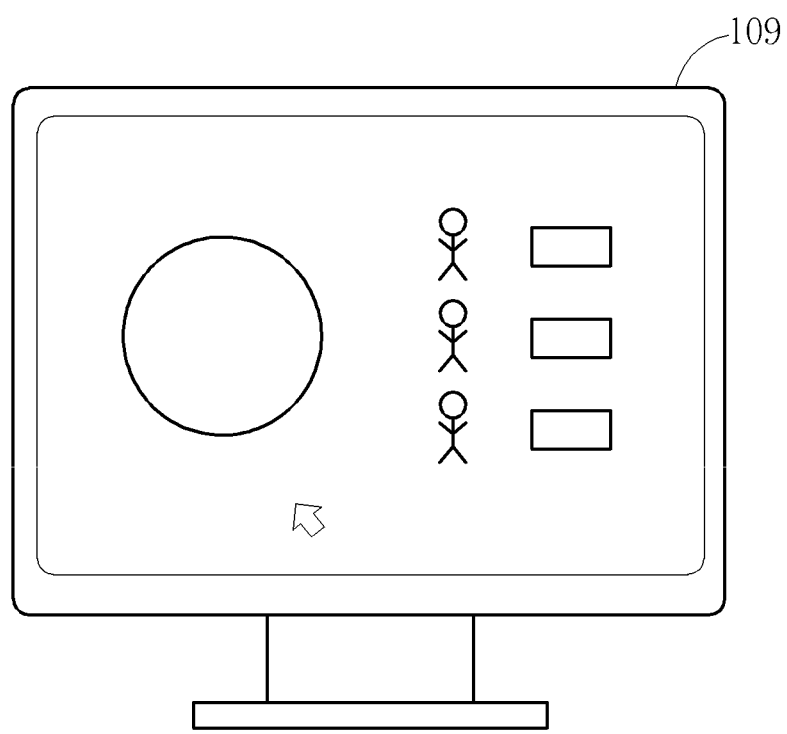
FIG. 3 is a schematic diagram illustrating the situation that an electronic system according to an embodiment executes a game software program.

FIG. 2 is a schematic diagram illustrating the situation that an electronic system 100 according to an embodiment executes a document processing software program. Please only the display 109 in the first electronic apparatus 101 is illustrated in the following embodiments, please also refer to FIG. 1 to understand the concept of the present invention for more clear. If a document processing software program such as word is executed, the processing unit 111 acquires information that the operation frequency for the second electronic apparatus 103 is lower when the document processing software program is executed according to report rate setting information recorded in the host 101, thus automatically sets the report rate of the second electronic apparatus 103 or the transmitting interface 105 to be lower. On the contrary, if a game software program as shown in FIG. 3 is executed, the processing unit 111 acquires information that the operation frequency for the second electronic apparatus 103 is higher when the game software program is executed according to report rate setting information recorded in the host 101, thus automatically sets the report rate of the second electronic apparatus 103 or the transmitting interface 105 to be higher. The above-mentioned report rate setting information can be set by a manufacturer in advance, or set by a user. The report rate setting information acquired by any method should fall in the scope of the present invention.

Please note the scope of the present invention is not limited to the document processing software program or the game software program, thus a mechanism that how the electronic system according to the present invention sets the report rate can be summarized as follows:

the processing unit 111 sets the report rate of the second electronic apparatus 103 or the transmitting interface 105 to a first report rate when the first electronic apparatus 101 executes a first type software program and sets the report rate of the second electronic apparatus 103 or the transmitting interface 105 to a second report rate higher than the first report rate when the first electronic apparatus 101 executes a second type software program, if an operation frequency for the second electronic apparatus 103 when the first electronic apparatus 101 executes the first type software program is lower than an operation frequency for the second electronic apparatus 103 when the first electronic apparatus 101 executes the second type software program.

The report rate setting information can be set by the manufacturer or the user, as above-mentioned. Furthermore, the processing unit 111 computes a statistics operation frequency of the second electronic apparatus 103 in a predetermined time period when the first electronic apparatus 101 executes a software program, and sets the report rate of the second electronic apparatus 103 or the transmitting interface 105 according to the statistics operation frequency if the first electronic apparatus 101 executes the software program again. Take FIG. 4 for example, if the report rate setting information does not comprise the information which report rate should be set to the second electronic apparatus 103 or the transmitting interface 105 when the first electronic apparatus 101 executes a media displaying software program, the processing unit 111 will compute a statistics operation frequency of the second electronic apparatus 103 in a predetermined time period when the first electronic apparatus 101 executes the media displaying software program. In the next time, if the first electronic apparatus 101 executes the media displaying software program again, the report rate for the second electronic apparatus 103 or the transmitting interface 105 is set according to the statistics operation frequency. Please note the above-mentioned report rate setting mechanism is not limited to be utilized to set report rates according to different types of software programs, but also can be utilized to set report rates according to the same types but different software programs. For example, one game software program may need fast and frequent movement for the second electronic apparatus 103, but another one does not. In such case, the operation frequencies for the second electronic apparatus 103 can be respectively computed for these two game software programs and the report rate of the second electronic apparatus 103 can be set accordingly.

Figure 5:
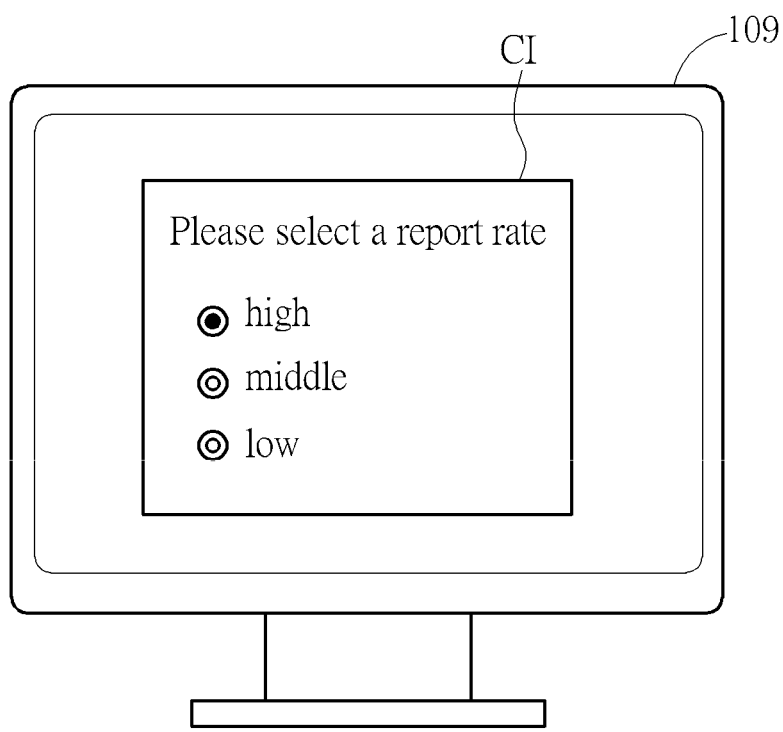
FIG. 5 and FIG. 6 are schematic diagrams illustrating how to manually set the report rate.
Figure 6:
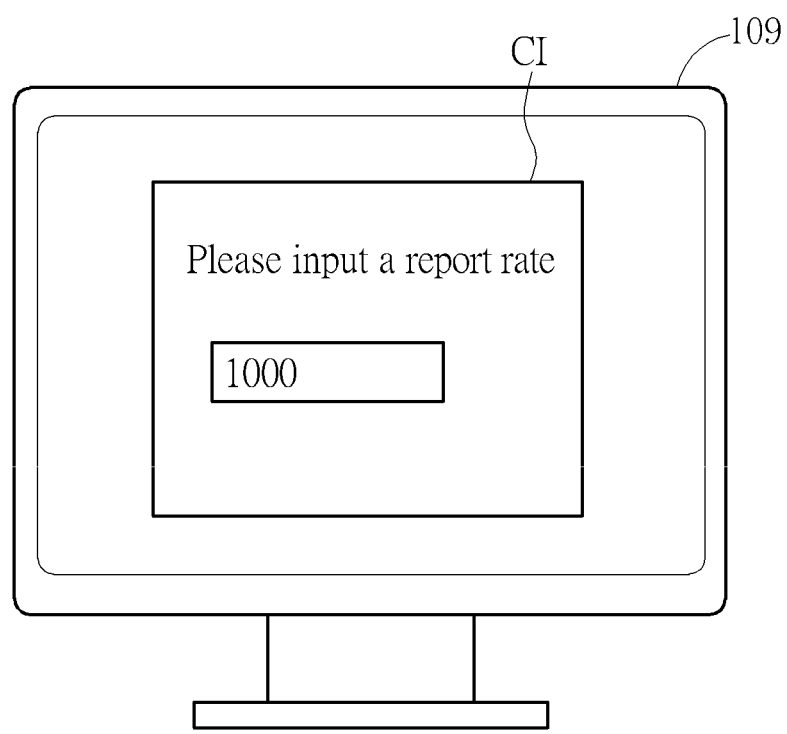

Besides above-mentioned automatic set mechanism, the present invention further provides a mechanism for manually setting the report rate. As shown in FIG. 5 and FIG. 6, the user can send a control command to the processing unit 111 in FIG. 1 via a control interface CI. The report rate is set according to the control command if the processing unit 111 in FIG. 1 receives the control command. The control interface CI can be utilized to set the report rate to a level (ex. high, medium, low) such as FIG. 5, or utilized to set the report rate directly to a value such as FIG. 6. Please note the mechanism for manually setting the report rate provided by the present invention is not limited to the embodiments shown in FIG. 5 and FIG. 6, the control interface CI can be interfaces for other types. The control interface CI can be activated by many mechanisms. For example, a switch can be provided on the second electronic apparatus 103 to activate the control interface CI, or it can be activated via clicking a symbol on the display 109.

The electronic system 100 according to the present invention 100 can further comprise a switch mechanism to determine how to set the report rate. For example, a hardware can be provided on the host 107 to determine which one of the following modes is performed: an automatic report rate setting, setting the report rate to a fixed value, manually setting the report rate. Alternatively, an interface can be shown on the display 109 such that the user select the mode via the interface. Such variations should fall in the scope of the present invention.

Figure 7:
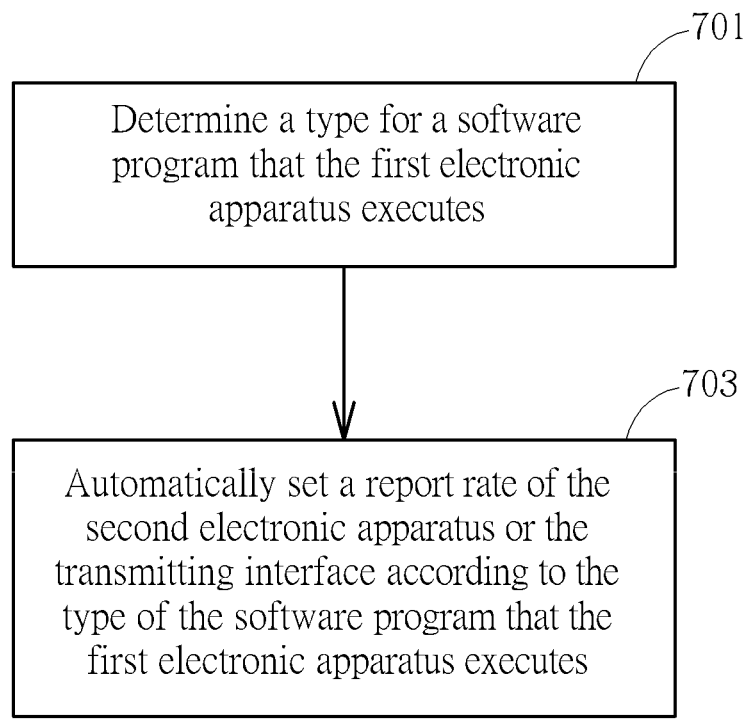
FIG. 7 to FIG. 9 are flow charts illustrating report rate setting methods according to embodiments of the present invention.
Figure 8:
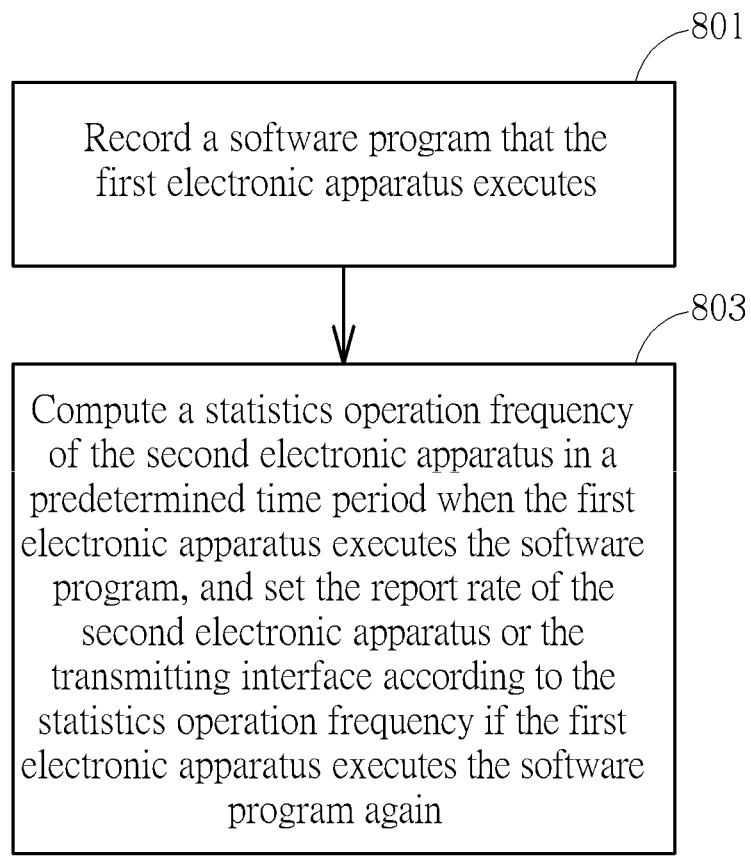
Figure 9:
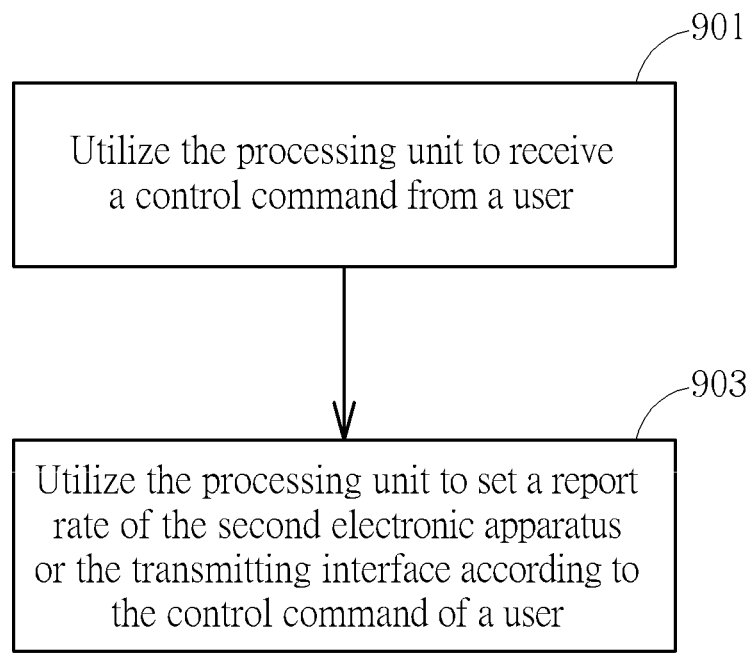

In view of above-mentioned embodiments, report rate setting methods shown in FIG. 7-FIG. 9 can be acquired. The report rate setting methods can be executed via a computer readable recording media having at least one program code recorded thereon. The report rate setting methods can be performed when the programs are executed.

The report rate setting method in FIG. 7 corresponds to the embodiments shown in FIG. 2 and FIG. 3, which comprise the following steps:

Step 701
Determine a type for a software program that the first electronic apparatus 101 executes.
Step 703
Automatically set a report rate of the second electronic apparatus 103 or the transmitting interface 105 according to the type of the software program that the first electronic apparatus 101 executes.

Figure 4:
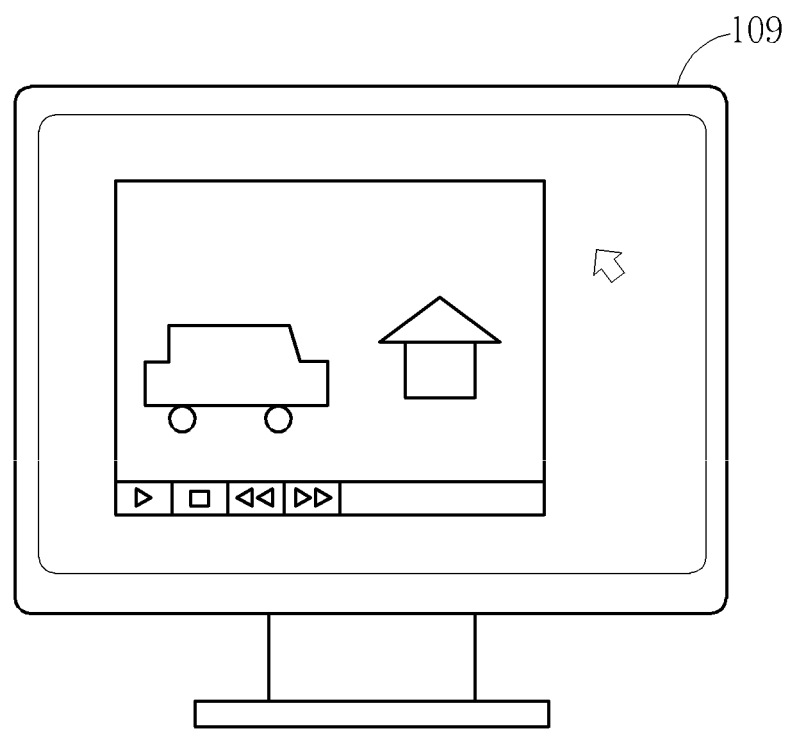
FIG. 4 is a schematic diagram illustrating the situation that an electronic system according to an embodiment executes a media displaying software program.

The report rate setting method in FIG. 8 corresponds to the embodiment shown in FIG. 4, which comprise the following steps:

Step 801
Record a software program that the first electronic apparatus 101 executes.
Step 803
Compute a statistics operation frequency of the second electronic apparatus 103 in a predetermined time period when the first electronic apparatus 101 executes the software program, and set the report rate of the second electronic apparatus 103 or the transmitting interface 105 according to the statistics operation frequency if the first electronic apparatus 101 executes the software program again.

The report rate setting method in FIG. 9 corresponds to the embodiments shown in FIG. 5 and FIG. 6, which comprise the following steps:

Step 901
Utilize the processing unit 111 to receive a control command from a user.
Step 903
Utilize the processing unit 111 to set a report rate of the second electronic apparatus 103 or the transmitting interface 105 according to the control command of a user.

The above-mentioned report rate setting method can be applied to any kinds of electronic apparatuses. Also, the above-mentioned report rate setting method can adjust the report rate according to other factors besides the types of software programs. Based on these concepts, electronic systems according to different embodiments of the present invention are provided in FIG. 10-FIG. 15.

Figure 10:
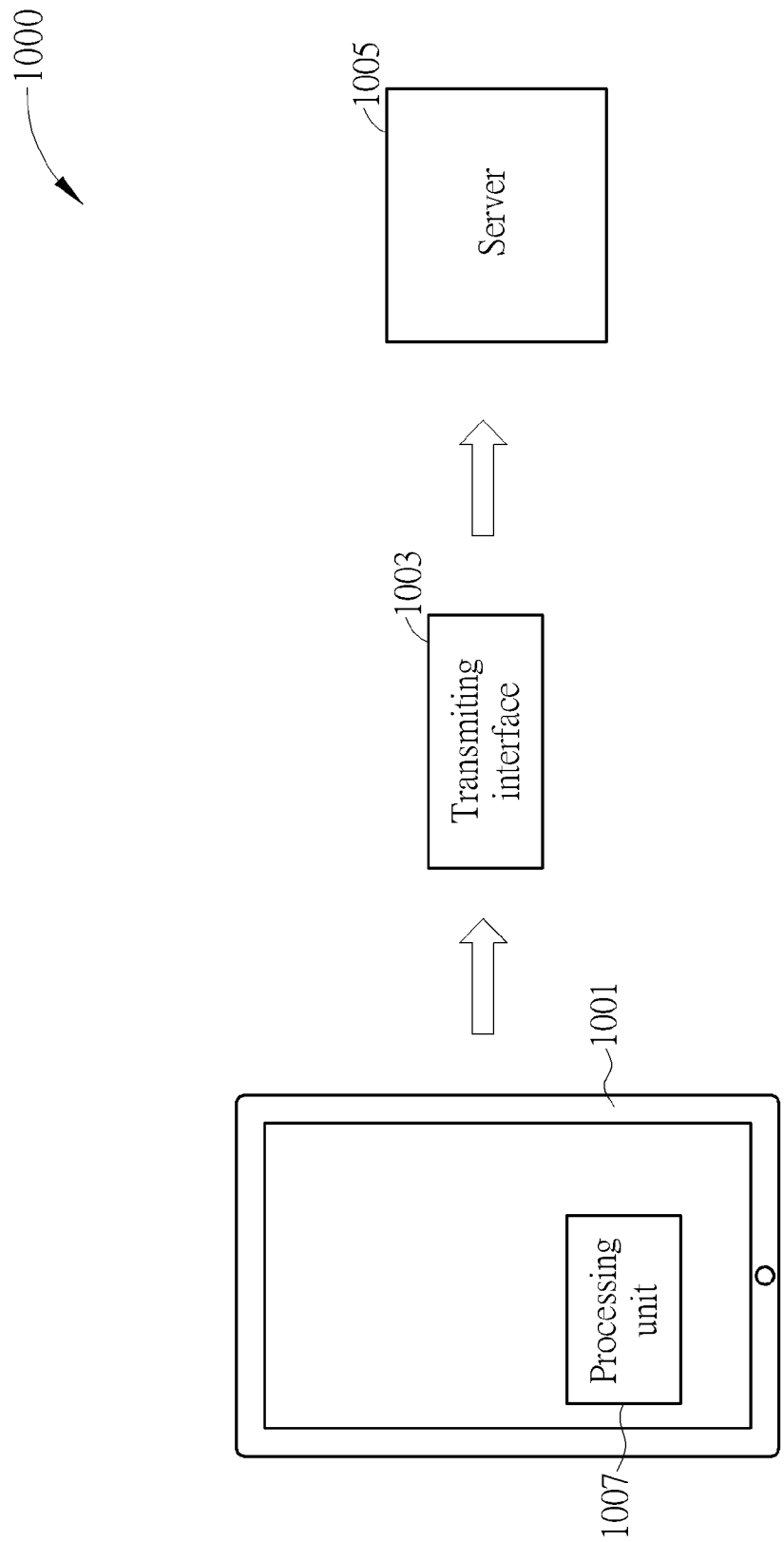
FIG. 10-FIG. 16 are schematic diagrams illustrating electronic systems according to different embodiments of the present invention.

In the embodiment of FIG. 10, the electronic system 1000 comprises a portable apparatus 1001 (ex. a mobile phone) comprising a processing unit 1007, a server 1005 and a transmitting interface 1003. The transmitting interface 1003 can be any interface that can provide communication between electronic apparatuses, for example, an USB interface, a network or a wireless communication interface such as wifi. Such definition can also be applied to the transmitting interface in other embodiments.

The portable apparatus 1001 transmits data to the server 1005 via the transmitting interface 1003. The processing unit 1007 determines a type of a software program that the portable apparatus 1001 executes. Also, the processing unit 1007 automatically sets a report rate of the portable apparatus 1001 or the transmitting interface 1003 according to the type of the software program. The report rate indicates a frequency at which the portable apparatus 1001 transmits data to the server 1005, and the report rate indicates a time gap between successive transmissions of data from the portable apparatus 1001 to the server 1005.

In one embodiment, if the software program is a game program, the report rate is set to be high, since a game program always causes high frequency operations for the portable apparatus 1001. On the contrary, if the software program is not a game program, the report rate is set to be low.

Figure 11:
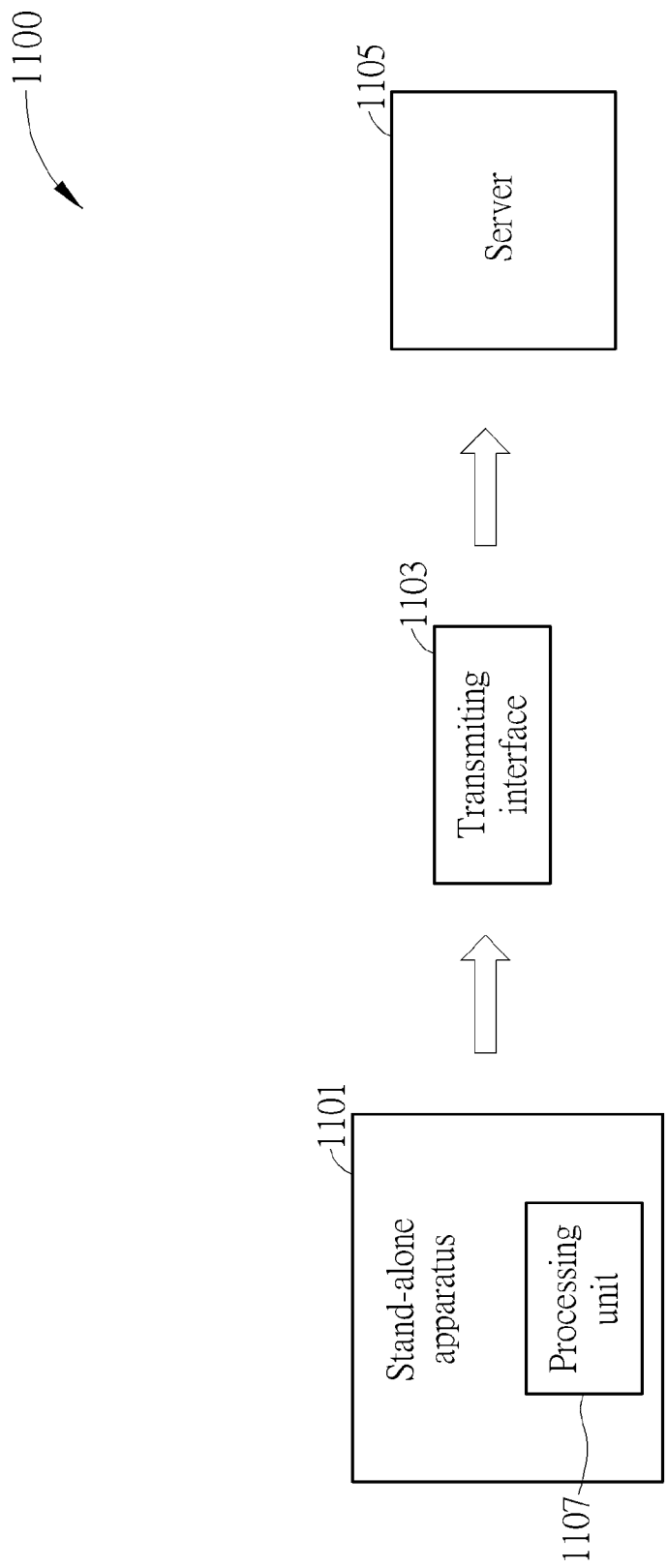

In the embodiment of FIG. 11, the electronic system 1100 comprises a stand-alone apparatus 1101, a transmitting interface 1103 and a server 1105. The stand-alone apparatus 1101 transmits data to the server 1105 via the transmitting interface 1103. The stand-alone apparatus 1101 indicates an electronic apparatus that can independently operate without coupled to a computer.

The processing unit 1107 in the stand-alone apparatus 1101 determines an operation state of the stand-alone apparatus, and automatically setting a report rate of the stand-alone apparatus 1101 or the transmitting interface 1103 according to the operation state. The report rate indicates a frequency at which the stand-alone apparatus 1101 transmits data to the server 1105, and the report rate indicates a time gap between successive transmissions of data from the stand-alone apparatus 1101 to the server 1105.

For example, if the stand-alone apparatus 1101 is in a standby mode, the report rate thereof is adjusted to be low since an amount for the operations for the stand-alone apparatus 1101 in the standby mode is low. On the contrary, if the stand-alone apparatus 1101 is in a normal state or an active state, the report rate thereof is adjusted to be high.

In one embodiment, the stand-alone apparatus 1101 is an always on apparatus. For example, the stand-alone apparatus 1101 is an always on listening apparatus, such that a user can control the stand-alone apparatus 1101 by speech. In another embodiment, the stand-alone apparatus 1101 is an always on watching apparatus such as a monitor.

In one embodiment, the stand-alone apparatus 1101 is a home managing apparatus applying Internet of Things. Also, the server 1105 is coupled to a plurality of appliances such as a TV, an air conditioner or a music player. In such embodiment, the user can control the stand-alone apparatus 1101 to transmit commands to the server 1105 via the transmitting interface 1103. After that, the server 1105 controls the appliance to operate based on the command. For example, the user says "turn on the TV" and the stand-alone apparatus 1101 receives such command. The stand-alone apparatus 1101 transmits the command "turn on the TV" to the server 1105. After that, the server 1105 identifies the command and accordingly turns on the TV coupled to the server 1105. Please note the stand-alone apparatus 1101 can be any type of home managing apparatus applying Internet of Things besides the above-mentioned always on listening apparatus. For example, the stand-alone apparatus 1101 can be an always on watch apparatus. In such embodiment, the stand-alone apparatus 1101 continuously keeps capturing images and gives a command to the server 1105 once the stand-alone apparatus 1101 captures an image comprising a user. For example, a user enters his house and the stand-alone apparatus 1101 captures an image comprising the user. In such case, the stand-alone apparatus 1101 gives commands to the server 105, to turn on the air conditioner and the TV in the house.

Figure 12:
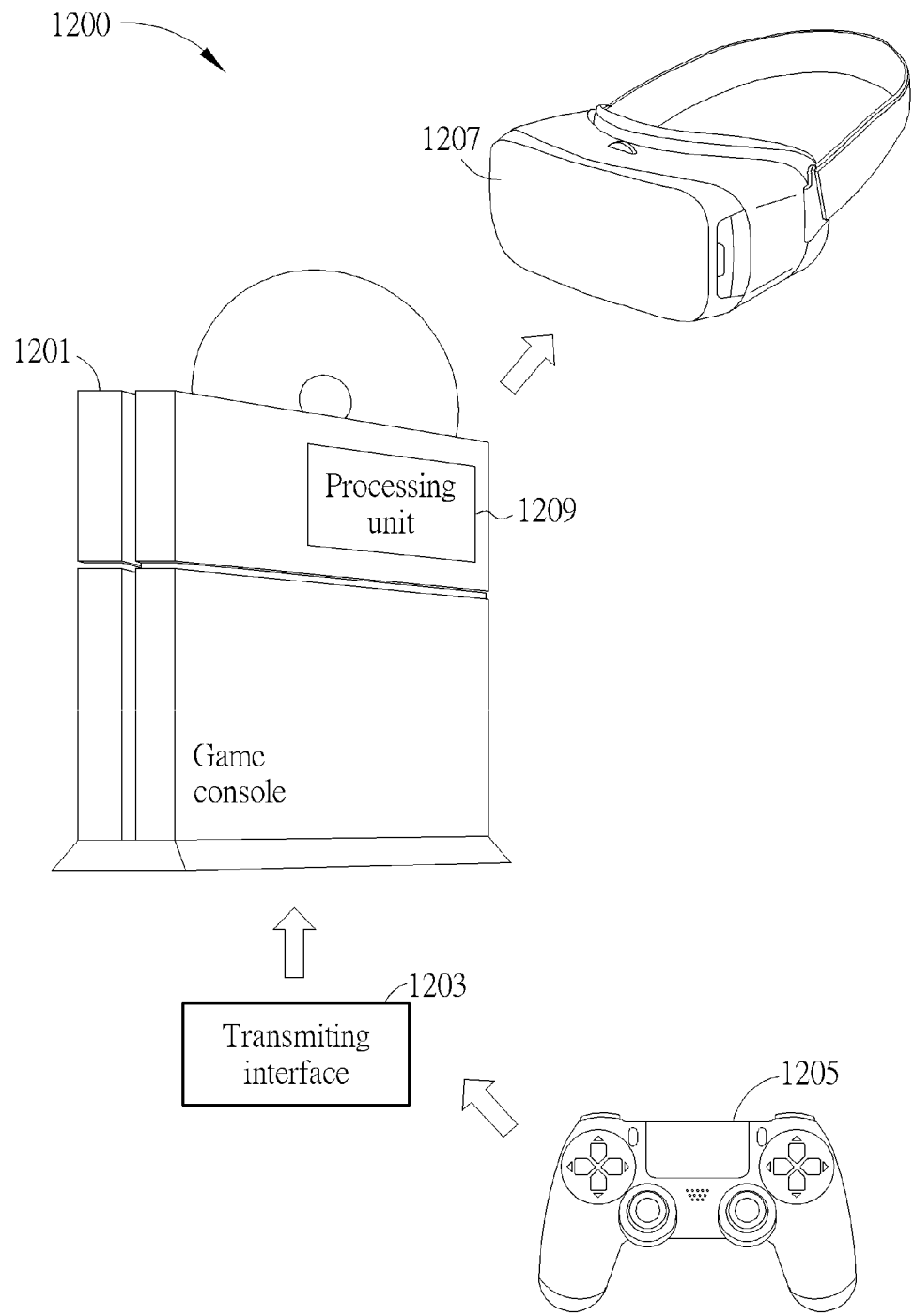

In the embodiment of FIG. 12, a VR (virtual reality) system 1200 comprises a game console 1201, a transmitting interface 1203, and a control apparatus 1205 (ex. a remote controller) is provided. The control apparatus 1205 transmits dada to the game console 1201 via the transmitting interface 1203, to control a game program that the game console 1201 executes. In one embodiment, the VR system 1200 further comprises a head set 1207, which can display the images generated by the game console 1201. In another embodiment, the game console 1201 is integrated to the head set 1207.

The processing unit 1209 in the game console 1201 determines a type of a game program that the game console executes. Also, the processing unit 1209 automatically sets a report rate of the control apparatus 1205 or the transmitting interface 1203 according to the type of the game program. The report rate indicates a frequency at which the control apparatus 1205 transmits data to the game console 1201, and the report rate indicates a time gap between successive transmissions of data from the control apparatus 1205 to the game console 1201.

For example, if the game program is a sport game in which the user should move the control apparatus 1205 or press the buttons on the control apparatus 1205 for a high frequency, the report rate is adjusted to be high. On the contrary, if the game program is a strategy game in which the user moves the control apparatus 1205 or presses the buttons on the control apparatus 1205 for a low frequency, the report rate is adjusted to be low.

Figure 13:
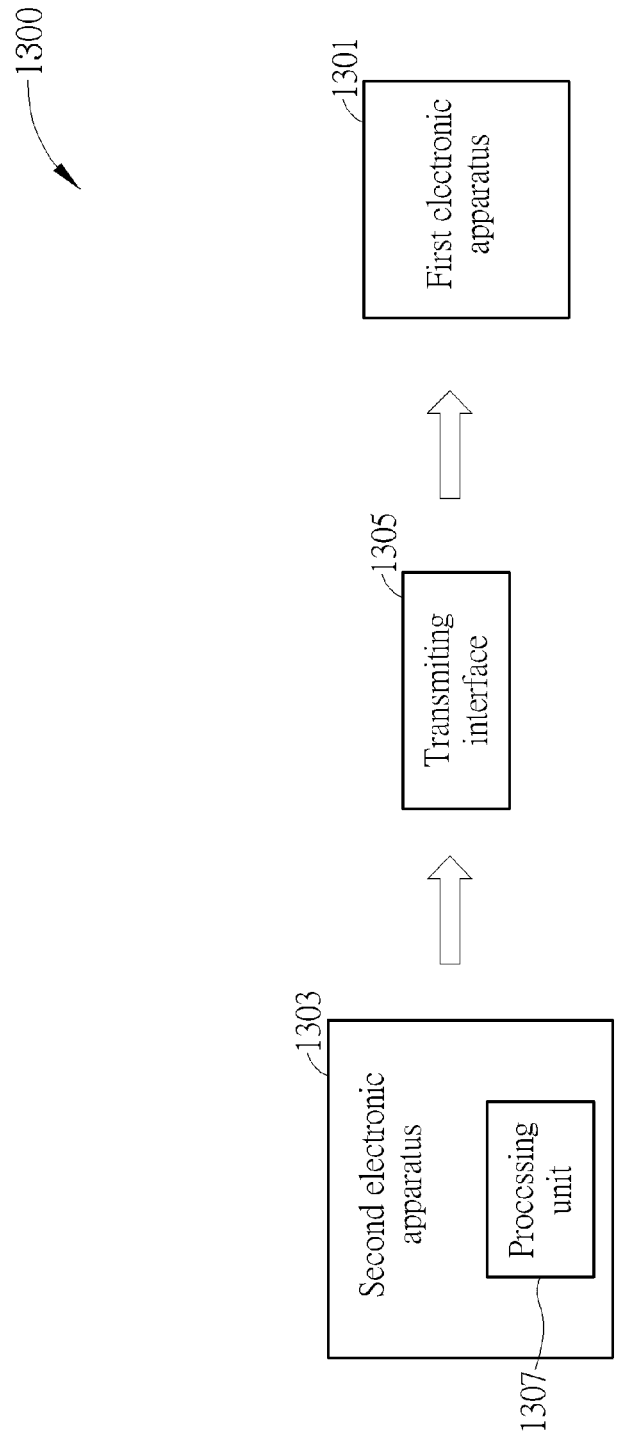

In the embodiment of FIG. 13, the electronic system 1300 comprises a first electronic apparatus 1301, a second electronic apparatus 1301 and a transmitting interface 1305. The second electronic apparatus 1303 transmits data to the first electronic apparatus 1301 via the transmitting interface 1305.

The processing unit 1307 in the second electronic apparatus 1303 determines an environment condition for the second electronic apparatus 1303, and automatically sets a report rate of the second electronic apparatus 1303 or the transmitting interface 1305 according to the environment condition. The report rate indicates a frequency at which the second electronic apparatus 1303 transmits data to the first electronic apparatus 1301, and the report rate indicates a time gap between successive transmissions of data from the second electronic apparatus 1303 to the first electronic apparatus 1301.

In one embodiment, the electronic system 1200 is an AR (Augmented Reality) system, the first electronic apparatus 1301 is a server, the second electronic apparatus 1303 is a portable apparatus and the environment condition is scenario surrounding the portable apparatus.

Figure 14:
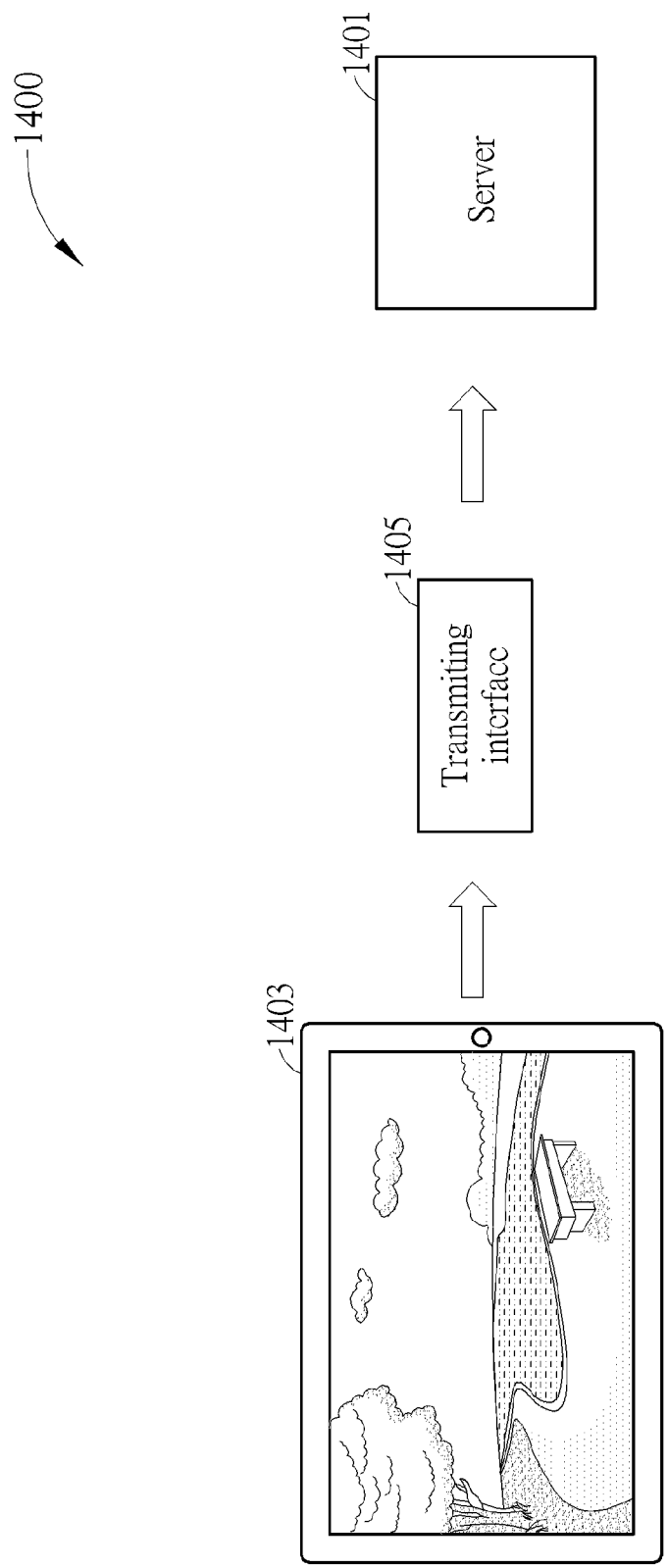
Figure 15:
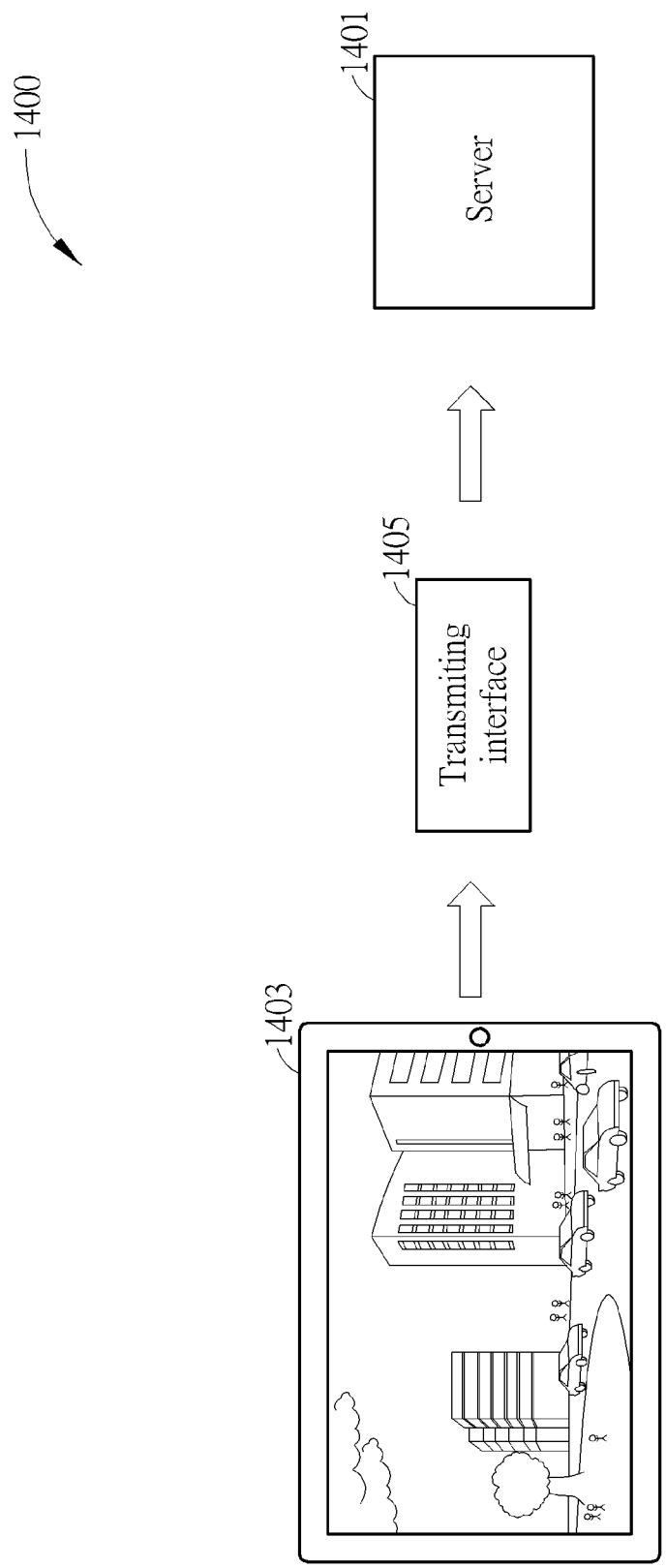

As illustrated in FIG. 14, the AR system 1400 comprises a server 1401, a transmitting interface 1405 and a portable apparatus 1403 (ex. a mobile phone). The portable apparatus 1403 transmits related data to the server 1401 via the transmitting interface 1405 while executing an AR program. In the embodiment of FIG. 14, the processing unit (not illustrated here) determines that the portable apparatus 1403 is in a scenario having few variation, such as a park, thus the report rate is adjusted to be low. On the contrary, if the portable apparatus 1403 is in a scenario having much variation, such as a city in FIG. 15, the report rate is adjusted to be high.

In one embodiment, the electronic system 1300 is a drone system, the first electronic apparatus 1301 is a control apparatus, the second electronic apparatus 1307 is a drone and the environment condition is a height of the drone.

Figure 16:
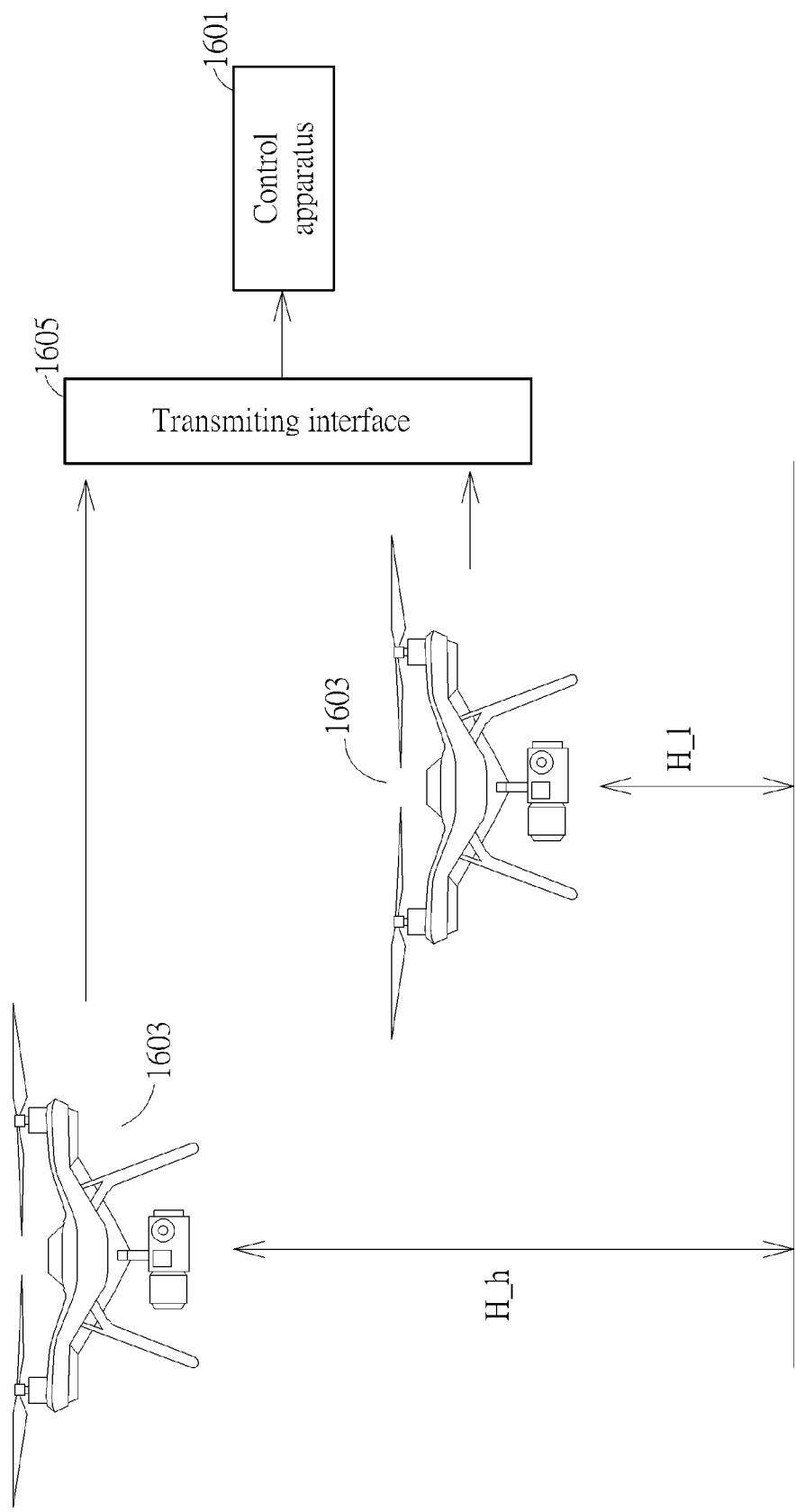

Please refer to FIG. 16, the drone 1603 transmits data to the control apparatus 1601 via the transmitting interface 1605. The control apparatus 1601 can be a remote controller particularly designed for the drone 1603, or a portable apparatus installed a control program for the drone 1603. As illustrated in FIG. 16, if the drone 1603 flies at a low height H_l, the processing unit in the drone 1603 sets the report rate of the drone 1603 or the transmitting interface 1605 to be high, since the environment maybe more complicated if the flying height is low. On the contrary, if the drone 1603 flies at a high height H_h, the processing unit in the drone 1603 sets the report rate of the drone 1603 or the transmitting interface 1605 to be low, since the environment maybe more simple if the flying height is high.

Based upon the embodiments illustrated in FIG. 10-FIG. 16, report rate setting methods can be acquired. The steps for these rate setting methods can be easily understood according to the embodiments illustrated in FIG. 10-FIG. 16, thus are omitted for brevity here.

In view of above-mentioned embodiments, the present invention provides a mechanism for automatically setting the report rate, such that the apparatus need to frequently transmit data can have an optimized balance for the sensitivity and the power consumption. Additionally, the present invention also provides a mechanism for manually setting the report rate, such that a user can rapidly and conveniently set the report rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable recording medium storing at least one program, a report rate setting method applied to an electronic system comprising a portable apparatus, a server and a transmitting interface can be performed if the program is executed, wherein the portable apparatus transmits data to the server via the transmitting interface, where the report rate setting method comprises:
(a) determining a type of a software program that the portable apparatus executes; and
(b) automatically setting a report rate of the portable apparatus or the transmitting interface according to the type of the software program, wherein the report rate indicates a frequency at which the portable apparatus transmits data to the server, and the report rate indicates a time gap between successive transmissions of data from the portable apparatus to the server.

2. The non-transitory computer readable recording medium of claim 1, wherein in the step (b) sets a report rate according to if the software program is a game program or not.

3. A non-transitory computer readable recording medium storing at least one program, a report rate setting method applied to an electronic system comprising a stand-alone apparatus, a server and a transmitting interface can be performed if the program is executed, wherein the stand-alone apparatus transmits data to the server via the transmitting interface, where the report rate setting method comprises:
(a) determining an operation state of the stand-alone apparatus; and
(b) automatically setting a report rate of the stand-alone apparatus or the transmitting interface according to the operation state, wherein the report rate indicates a frequency at which the stand-alone apparatus transmits data to the server, and the report rate indicates a time gap between successive transmissions of data from the stand-alone apparatus to the server.

4. The non-transitory computer readable recording medium of claim 3, wherein the stand-alone apparatus is an always on apparatus.

5. The non-transitory computer readable recording medium of claim 4, wherein the stand-alone apparatus is a home managing apparatus applying Internet of Things.

6. A non-transitory computer readable recording medium storing at least one program, a report rate setting method applied to a virtual reality (VR) system comprising a game console, a control apparatus and a transmitting interface can be performed if the program is executed, wherein the control apparatus transmits data to the game console via the transmitting interface, wherein the report rate setting method comprises:
(a) determining a type of a game program that the game console executes; and
(b) automatically setting a report rate of the control apparatus or the transmitting interface according to the type of the game program, wherein the report rate indicates a frequency at which the control apparatus transmits data to the game console, and the report rate indicates a time gap between successive transmissions of data from the control apparatus to the game console.

7. A non-transitory computer readable recording medium storing at least one program, a report rate setting method applied to an electronic system comprising a first electronic apparatus, a second electronic apparatus and a transmitting interface can be performed if the program is executed, wherein the second electronic apparatus transmits data to the first electronic apparatus via the transmitting interface, where the report rate setting method comprises:
(a) determining an environment condition for the second electronic apparatus; and
(c) automatically setting a report rate of the second electronic apparatus or the transmitting interface according to the environment condition, wherein the report rate indicates a frequency at which the second electronic apparatus transmits data to the first electronic apparatus, and the report rate indicates a time gap between successive transmissions of data from the second electronic apparatus to the first electronic apparatus.

8. The non-transitory computer readable recording medium of claim 7, wherein the electronic system is an augmented reality (AR) system the first electronic apparatus is a server, the second electronic apparatus is a portable apparatus and the environment condition is scenario surrounding the portable apparatus.

9. The non-transitory computer readable recording medium of claim 7, wherein the electronic system is a drone system, the first electronic apparatus is a control apparatus, the second electronic apparatus is a drone and the environment condition is a height of the drone.

* * * * *